(12) United States Patent
Devlin (10) Patent No.: US 8,744,243 B2
(45) Date of Patent: Jun. 3, 2014

(54) SYSTEM AND METHOD OF STORING VIDEO CONTENT (75) Inventor: Michael Devlin, Leander, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1318 days.

(21) Appl. No.: 11/825,649

(22) Filed: Jul. 6, 2007

(65) Prior Publication Data

US 2009/0010618 A1    Jan. 8, 2009

(51) Int. Cl.
*H04N 5/76* (2006.01)
*H04N 5/93* (2006.01)
*G11B 27/00* (2006.01)
*H04N 5/77* (2006.01)

(52) U.S. Cl.
USPC .......... 386/282; 386/224; 386/225; 386/235; 386/238; 386/278; 386/280

(58) Field of Classification Search
USPC .......... 386/224–225, 235, 238, 278, 280, 282
See application file for complete search history.

(56) References Cited

U.S. PATENT DOCUMENTS

| | | | | |
|---|---|---|---|---|
| 7,292,775 B1 * | 11/2007 | Boyle et al. | | 386/291 |
| 7,325,244 B2 * | 1/2008 | Boyle et al. | | 725/39 |
| 7,477,833 B2 * | 1/2009 | Kato et al. | | 386/241 |
| 7,493,646 B2 * | 2/2009 | Ellis | | 725/87 |
| 7,861,258 B2 * | 12/2010 | Barton et al. | | 725/28 |
| 2002/0040475 A1 * | 4/2002 | Yap et al. | | 725/39 |
| 2002/0174430 A1 * | 11/2002 | Ellis et al. | | 725/46 |
| 2003/0167471 A1 * | 9/2003 | Roth et al. | | 725/87 |
| 2006/0064716 A1 * | 3/2006 | Sull et al. | | 725/37 |
| 2006/0205410 A1 * | 9/2006 | Black | | 455/445 |
| 2006/0218585 A1 * | 9/2006 | Isobe et al. | | 725/39 |
| 2007/0277201 A1 * | 11/2007 | Wong et al. | | 725/40 |

* cited by examiner

*Primary Examiner* — Daquan Zhao
(74) *Attorney, Agent, or Firm* — Toler Law Group, PC (57) ABSTRACT

A method of storing video content is disclosed and includes storing video content associated with a video content selection at a personal video recording (PVR) device. The method also includes associating an indicator of the video content selection with a file folder at the PVR device. Further, the method includes sending a graphical user interface (GUI) from the PVR device to a display device in response to receiving a selection of the file folder at the PVR device, wherein the GUI includes the indicator of the video content selection and wherein the indicator of the video content selection is marked as viewed or unviewed.

25 Claims, 8 Drawing Sheets

SYSTEM AND METHOD OF STORING VIDEO CONTENT

FIELD OF THE DISCLOSURE

The present disclosure is generally related to storing video content.

BACKGROUND

Personal video recording (PVR) devices provide a convenient means for individuals to view video content. Nonetheless, users may be forced to sift through numerous video content selections recorded by the PVR in order to find video content that they wish to view. Moreover, a user may not be able to readily determine whether a video content selection recorded by another user has been viewed and may be deleted to free up space to record additional video content. Hence, there is a need for an improved system and method of storing video content.

DETAILED DESCRIPTION OF THE DRAWINGS

A system to store video content is disclosed and includes a personal video recording (PVR) device including processing logic and a memory accessible to the processing logic. The memory includes instructions to store an indicator of a video content selection recorded at the PVR device in association with one of a plurality of file collections stored at the PVR device. The memory also includes instructions to provide a graphical user interface (GUI) to a display device in response to receiving a selection of the one of the plurality of file collections at the PVR device. The GUI includes the indicator of the video content selection, and the indicator of the video content selection is marked as viewed or unviewed.

In another embodiment, a method of storing video content is disclosed and includes storing video content associated with a video content selection at a personal video recording (PVR) device. The method also includes associating an indicator of the video content selection with a file folder at the PVR device. Further, the method includes sending a graphical user interface (GUI) from the PVR device to a display device in response to receiving a selection of the file folder at the PVR device, wherein the GUI includes the indicator of the video content selection and wherein the indicator of the video content selection is marked as viewed or unviewed.

In another embodiment, a method of storing video content is disclosed and includes providing a graphical user interface (GUI) of a personal video recording (PVR) device to a display device, where the GUI includes at least one selectable file folder. The method also includes receiving a selection of a file folder via the GUI. The method also includes providing a file folder interface to the display device. The file folder interface includes at least one indicator of a video content selection associated with the selected file folder, where each indicator is marked as viewed or unviewed.

In another embodiment, a computer-readable medium is disclosed that includes processor-readable instructions that are executable by a processor to perform a method of storing video content. The method comprises storing video content associated with a video content selection at a personal video recording (PVR) device; associating an indicator of the video content selection with a file collection at the PVR device; and providing a graphical user interface (GUI) to a display device in response to receiving a selection of the file collection, where the GUI includes the indicator of the video content selection and where the indicator of the video content selection is marked as viewed or unviewed.

Figure 1:
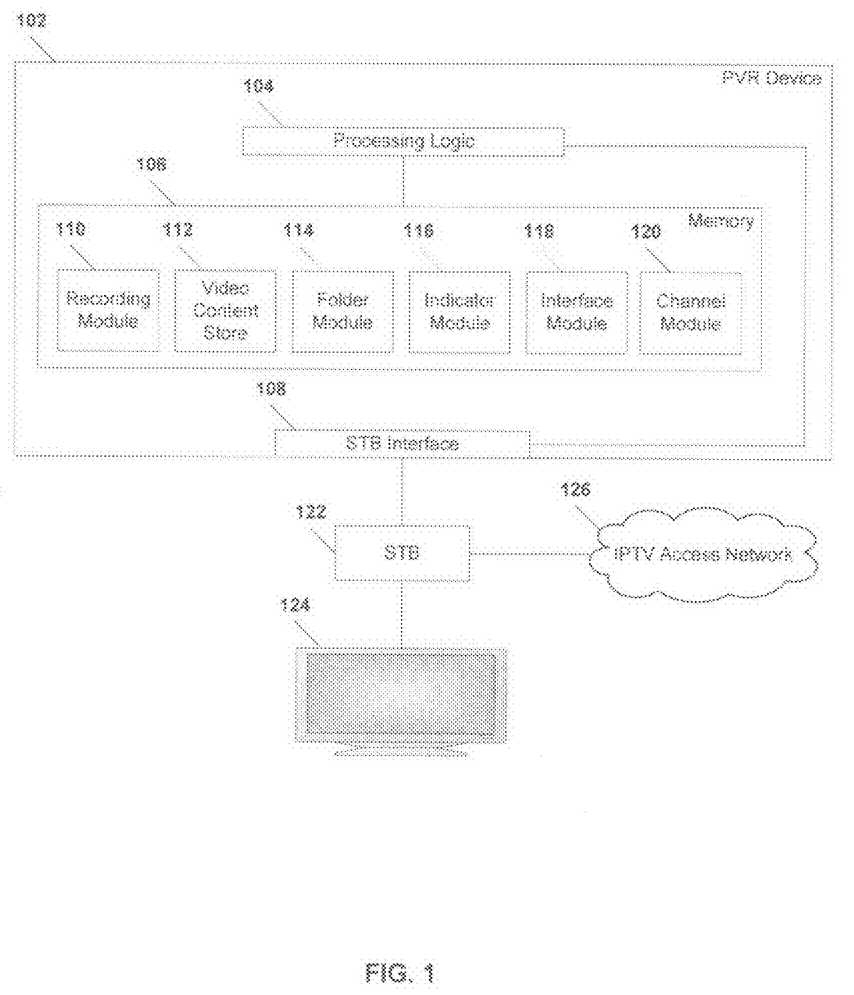
FIG. 1 is a block diagram illustrating a particular embodiment of a system to store video content.

Referring to FIG. 1, a particular embodiment of a system to store video content is illustrated and designated generally 100. The system 100 includes a personal video recording (PVR) device that communicates with a display device 124 via a set-top box device 122. Further, the PVR 102 can communicate with a video distribution network, such as the Internet Protocol Television (IPTV) access network 126, via the set-top box device 122. In an illustrative embodiment, the PVR device 102 can be a digital video recorder (DVR).

As shown in FIG. 1, the PVR device 102 includes processing logic 104 and memory 106 accessible to the processing logic 104. Further, the PVR device 102 can include a set-top box interface 108 to facilitate communication between the PVR device 102 and the set-top box device 122. The memory 106 can include a plurality of modules 110-120 adapted to provide various functions of the PVR device 102. For example, the modules 110-120 can include instructions that are executable by the processing logic 104 to perform such functions. The instructions can be embodied in one or more software programs, operating systems, or any combination thereof, stored at the PVR device 102. In another embodiment, the modules 110-120 can include software instructions, hardware logic, or any combination thereof.

In a particular embodiment, the PVR device 102 includes a recording module 110 that is executable by the processing logic 104 to record video content selections that are designated by a user. In one embodiment, the user can designated a video content selection for recording via a graphical user interface provided to the display device 124 by the set-top box device 122, the PVR device 102, or any combination thereof. The video content associated with such video content selections can be stored at the video content store 112. Video content selections can include programming received via the IPTV access network 126, photographs, home video content received from a video camera or other electronic or computing device, peer-to-peer content received from other PVR devices or set-top box devices via the IPTV access network 126, or any combination thereof.

The memory 106 can include a file folder module 114 that is executable by the processing logic 104 to provide an interface that allows a user to create one or more file collections, such as one or more file folders, for storing video content selections that are recorded at the PVR device 102. The interface can allow the user to create user-based file collections, such as folders associated with individuals in a household, as well as non-user-based file collections that relate to, for example, video content categories. In an illustrative embodiment, the interface can allow the user to designate a personal identification number (PIN) or other authentication token necessary to access one or more of the file collections.

The file folder module 114 can store file collections created by users associated with the PVR device 102. In addition, the file folder module 114 can associate video content selections stored at the video content store 112 with one or more file collections. The memory 106 can include an indicator module 116 that is executable by the processing logic 104 to associate a selectable indicator of a video content selection with a file folder or other file collection designated by a user at the time of recording or via preferences specified by the user (e.g., store all shows on channel 43 to 'KIDS' folder). An indicator can be, for instance, a shortcut to a video content selection stored at the video content store 112. Indicators can be named according to a program title or a user-defined name.

Figure 6:
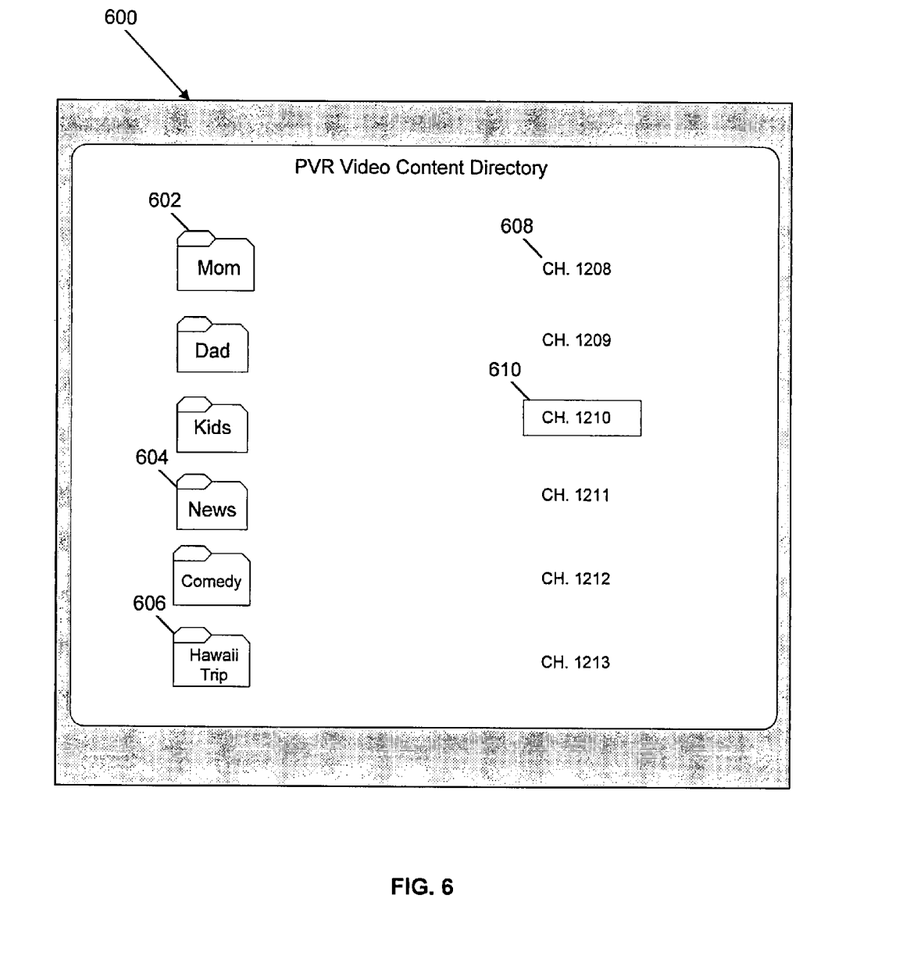
FIG. 6 is a diagram illustrating a particular embodiment of a graphical user interface related to storing video content.
Figure 7:
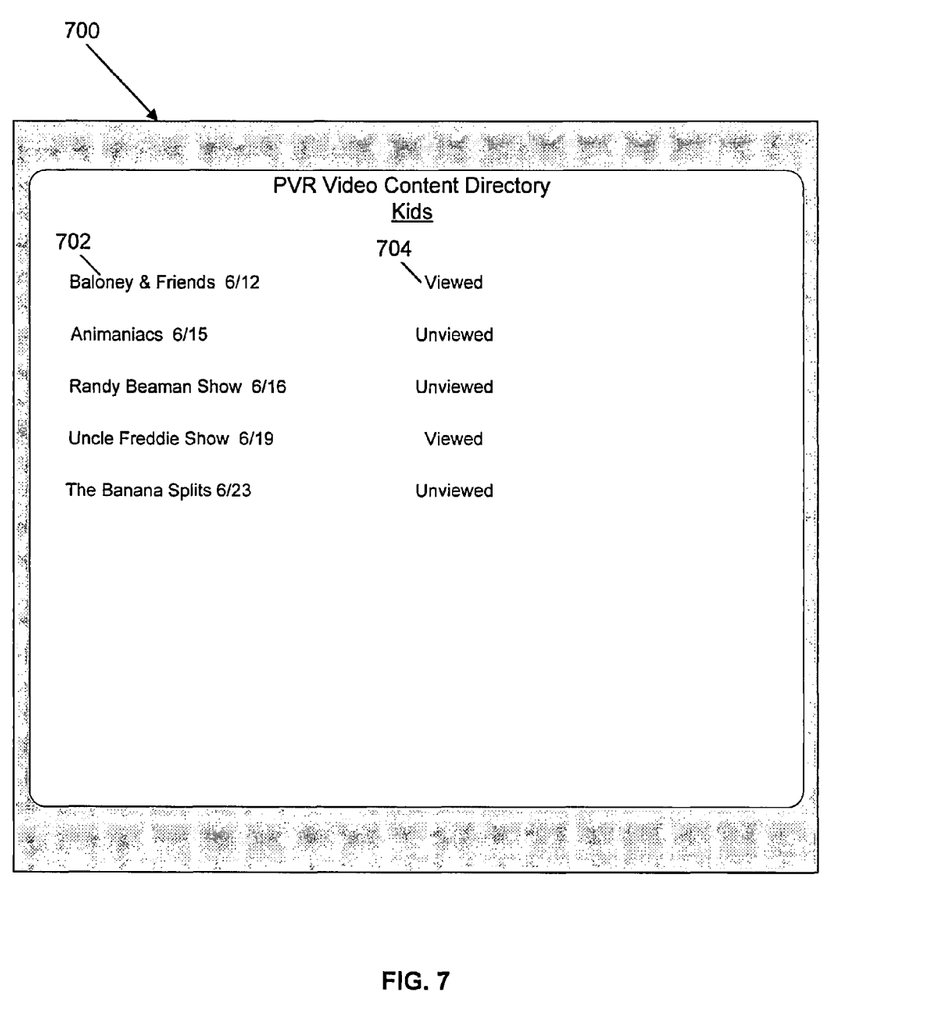
FIG. 7 is a diagram illustrating a second particular embodiment of a graphical user interface related to storing video content.

In a particular embodiment, the memory 106 can include an interface module 118 that is executable by the processing logic 104 to provide a plurality of graphical user interfaces (GUIs) to the display device 124. For example, the interface module 118 can be executable by the processing logic 104 to provide a GUI to the display device 124 showing selectable indicators of folders or other file collections stored at the PVR device 102. An example of such a GUI is illustrated in FIG. 6. In response to a selection of an indicator of a file folder or other file collection, the interface module 118 can be executable by the processing logic 104 to provide a second GUI to the display device 124, such as a file folder interface, that displays selectable indicators of video content selections associated with the selected file collection. Each indicator of a video content selection is marked as 'viewed' or 'unviewed.' Each indicator can be selected to play back video content associated with the indicator, and the indicator can be re-marked as 'viewed,' unless it is already so marked. An example of the second GUI is illustrated in FIG. 7. In an illustrative, non-limiting embodiment, the second GUI can be provided to the display device 124 after an authentication token associated with a selected file collection is received at the PVR device 102.

In a particular embodiment, the interface module 118 can be executable by the processing logic 104 to receive a command via the file folder interface to delete an indicator from a file folder or other file collection. In response to such a command, the file folder module 114 or other element of the PVR device 102 can be executable by the processing logic 104 to delete the indicator from the selected folder. In addition, the file folder module 114 or other element of the PVR device 102 can be executable by the processing logic 104 to determine whether the indicator is associated with any other folder or file collection at the PVR device 102. If the indicator is not associated with any other folder or file collection at the PVR device 102, the associated video content can be deleted from a video content store at the PVR device 102 in addition to the indicator being deleted from the selected folder. In another embodiment, the PVR device 102 can determine, after deleting the indicator from the selected folder, whether the indicator is associated with any folder at the PVR device 102. If the indicator is not associated with any folder, the associated video content can be deleted from the PVR device 102.

In a particular embodiment, the memory 106 can include a channel module 120 that is executable to associate a channel of the video distribution network with each file collection stored at the PVR device 102. The interface module 118 can be executable by the processing logic 104 to include selectable indicators of such channels with the graphical user interface displaying file collections stored at the PVR device 102. The channel module 120 can be executable by the processing logic 104 to provide a plurality of video content selections associated with the file collection corresponding to the channel to the display device. For instance, video content selections associated with indicators marked as unviewed in the file folder or other file collection could be provided to the display device 124 in an order listed or recorded in response to a selection of the channel corresponding to the file folder or other file collection.

Figure 2:
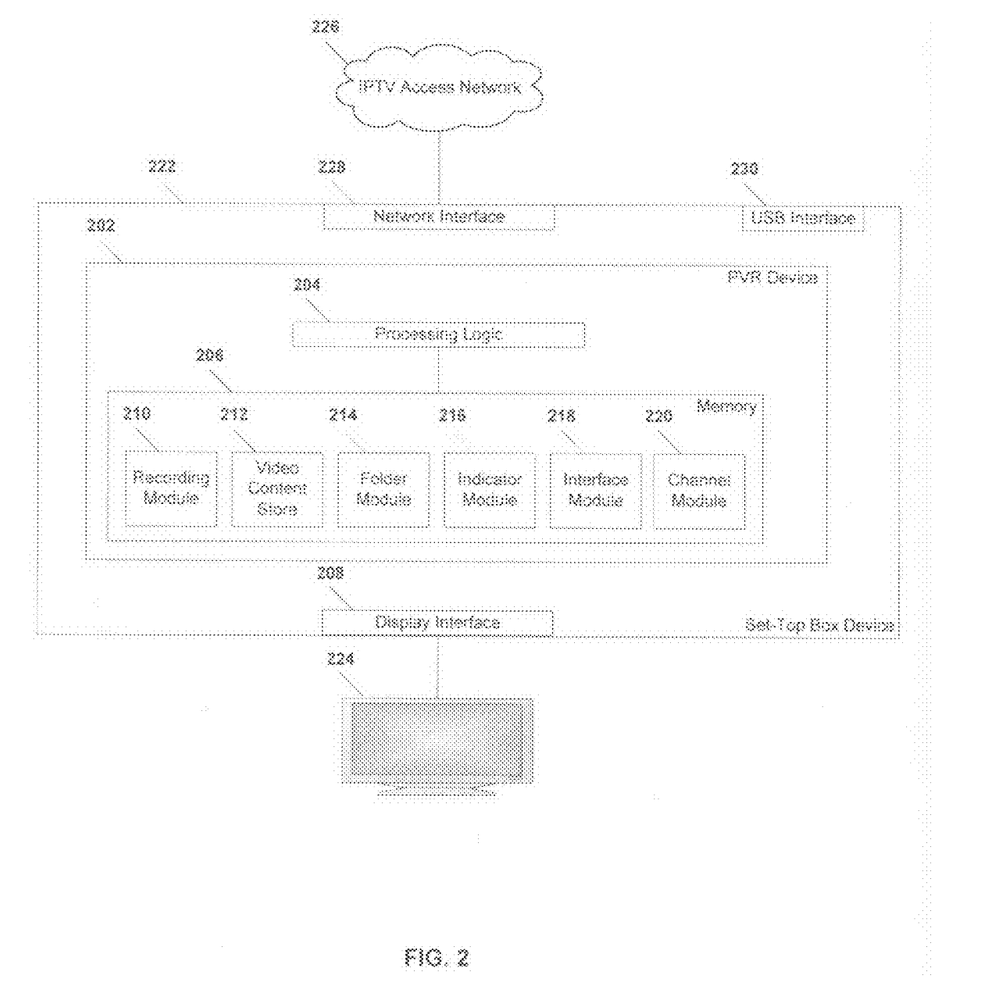
FIG. 2 is a block diagram illustrating a second particular embodiment of a system to store video content.

Referring to FIG. 2, a second particular embodiment of a system to store video content is illustrated and designated generally 200. The system 200 includes a personal video recording (PVR) device that is integrated with a set-top box device 222. In an illustrative embodiment, the PVR device 202 can be a digital video recorder (DVR). The set-top box device 222 communicates with a display device 224 via a display interface 208. Further, the set-top box device 222 can communicate with a video distribution network, such as the Internet Protocol Television (IPTV) access network 226, via a network interface 228. In an illustrative embodiment, the set-top box device 222 can communicate with other electronic or computing devices via a universal serial bus (USB) interface 230 or other interface.

As shown in FIG. 2, the PVR device 202 can include memory 206 accessible to the processing logic 204. The processing logic 204 can be associated with the set-top box device 222. For instance, the memory 206 can be included in an expansion card that is receivable by a card slot interface of the set-top box device 222. Alternatively, the PVR device 202 can include the processing logic 204, and the set-top box device 222 can include separate processing logic adapted to communicate with the PVR device 202.

The memory 206 can include a plurality of modules 210-220 adapted to provide various functions of the PVR device 202. For example, the modules 210-220 can include instructions that are executable by the processing logic 204 to perform such functions. The instructions can be embodied in one or more software programs, operating systems, or any combination thereof, stored at the PVR device 202. In another embodiment, the modules 210-220 can include software instructions, hardware logic, or any combination thereof.

In a particular embodiment, the PVR device 202 includes a recording module 210 that is executable by the processing logic 204 to record video content selections that are designated by a user. In one embodiment, the user can designated a video content selection for recording via a graphical user interface provided to the display device 224 by the set-top box device 222, the PVR device 202, or any combination thereof. The video content associated with such video content selections can be stored at the video content store 212. Video content selections can include programming received via the IPTV access network 226, photographs, home video content received from a video camera or other electronic or computing device, peer-to-peer content received from other PVR devices or set-top box devices via the IPTV access network 226, or any combination thereof.

The memory 206 can include a file folder module 214 that is executable by the processing logic 204 to provide an interface to the display device 224 via the display interface 208, which allows a user to create one or more file collections, such as one or more file folders, for storing video content selections that are recorded via the PVR device 202. The interface can allow the user to create user-based file collections, such as folders associated with individuals in a household, as well as non-user-based file collections that relate to, for example, video content categories. In an illustrative embodiment, the interface can allow the user to designate a personal identification number (PIN) or other authentication token necessary to access one or more of the file collections.

The file folder module 214 can store file collections created by users associated with the PVR device 202. In addition, the file folder module 214 can associate video content selections stored at the video content store 212 with one or more file collections. The memory 206 can include an indicator module 216 that is executable by the processing logic 204 to associate a selectable indicator of a video content selection with a file folder or other file collection designated by a user at the time of recording or via preferences specified by the user (e.g., store all shows on channel 43 to 'KIDS' folder). An indicator can be, for instance, a shortcut to a video content selection stored at the video content store 212. Indicators can be named according to a program title or a user-defined name.

In a particular embodiment, the memory 206 can include an interface module 218 that is executable by the processing logic 204 to provide a plurality of graphical user interfaces (GUIs) to the display device 224 via the display interface 208. For example, the interface module 218 can be executable by the processing logic 204 to provide a GUI to the display device 224 showing selectable indicators of folders or other file collections stored at the PVR device 202. An example of such a GUI is illustrated in FIG. 6. In response to a selection of an indicator of a file folder or other file collection, the interface module 218 can be executable by the processing logic 204 to provide a second GUI to the display device 224, such as a file folder interface, that displays selectable indicators of video content selections associated with the selected file collection. Each indicator of a video content selection is marked as 'viewed' or 'unviewed.' Each indicator can be selected to play back video content associated with the indicator, and the indicator can be re-marked as 'viewed,' unless it is already so marked. An example of the second GUI is illustrated in FIG. 7. In an illustrative, non-limiting embodiment, the second GUI can be provided to the display device 224 after an authentication token associated with a selected file collection is received at the PVR device 202.

In a particular embodiment, the interface module 218 can be executable by the processing logic 204 to receive a command via the file folder interface to delete an indicator from a file folder or other file collection. In response to such a command, the file folder module 214 or other element of the PVR device 202 can be executable by the processing logic 204 to delete the indicator from the selected folder. In addition, the file folder module 214 or other element of the PVR device 202 can be executable by the processing logic 204 to determine whether the indicator is associated with any other folder or file collection at the PVR device 202. If the indicator is not associated with any other folder or file collection at the PVR device 202, the associated video content can be deleted from a video content store at the PVR device 202 in addition to the indicator being deleted from the selected folder. In another embodiment, the PVR device 202 can determine, after deleting the indicator from the selected folder, whether the indicator is associated with any folder at the PVR device 202. If the indicator is not associated with any folder, the associated video content can be deleted from the PVR device 202.

In a particular embodiment, the memory 206 can include a channel module 220 that is executable to associate a channel of the video distribution network with each file collection stored at the PVR device 202. The interface module 218 can be executable by the processing logic 204 to include selectable indicators of such channels with the graphical user interface displaying file collections stored at the PVR device 202. The channel module 220 can be executable by the processing logic 204 to provide a plurality of video content selections associated with the file collection corresponding to the channel to the display device. For instance, video content selections associated with indicators marked as unviewed in the file folder or other file collection could be provided to the display device 224 in an order listed or recorded in response to a selection of the channel corresponding to the file folder or other file collection.

Figure 3:
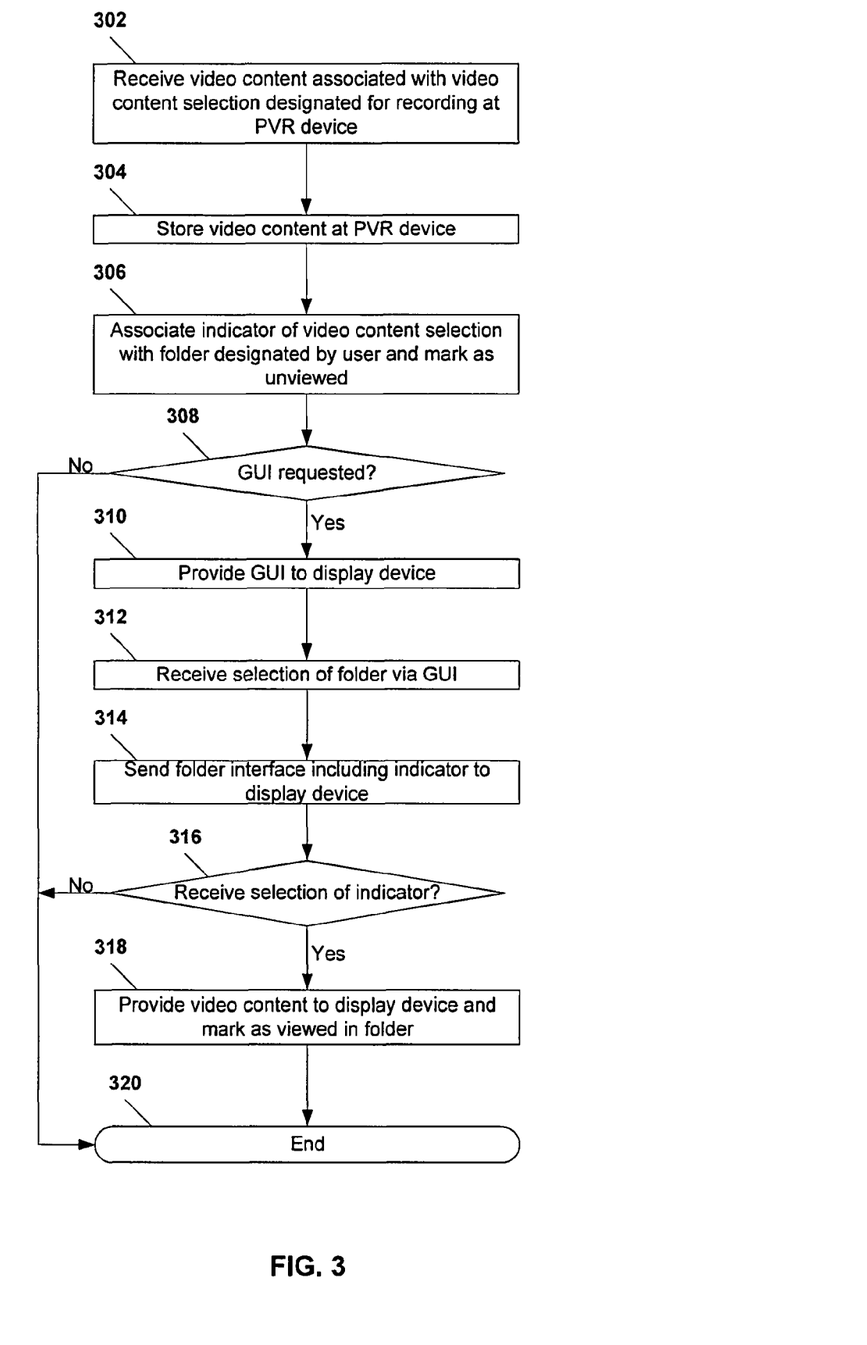
FIG. 3 is a flow diagram illustrating a particular embodiment of a method of storing video content.

Referring to FIG. 3, a particular embodiment of a method of storing video content is illustrated. At block 302, video content associated with a video content selection designated by a user for recording is received at a personal video recording (PVR) device. Moving to block 304, the PVR device stores the video content. Proceeding to block 306, the PVR device associates an indicator of the video content selection with a file folder designated by a user and marks the indicator as unviewed. The indicator can be a title of the video content selection provided by a content provider or specified by the user. A file folder with which the indicator is associated can be designated by the user when the video content selection is designated for recording, after the video content is recorded, or by pre-defined user preferences. The indicator can also be associated with additional folders.

Proceeding to decision node 308, the PVR device can determine whether a graphical user interface (GUI) displaying folders stored at the PVR device is to be displayed. For example, the PVR device can display the file folders on start-up or in response to a menu command received from the user. If the GUI is not to be displayed, the method terminates at 320. Conversely, if the GUI is to be displayed, the method continues to block 310, and the GUI is provided to a display device communicating with the PVR device. Advancing to block 312, the PVR device can receive a selection of a file folder via the GUI. At block 314, the PVR device provides a file folder interface to the display device that includes the indicator of the video content selection stored at block 304. The file folder interface can also include indicators of other video content selections associated with the file folder, where each indicator is marked as 'viewed' or 'unviewed.'

Moving to decision node 316, the PVR device can determine whether it has received a selection of the indicator of the video content selection. If the PVR device receives such a selection, the PVR device can provide video content associated with the indicator to the display device and mark the indicator as 'viewed' in the file folder. The method terminates at 320.

Figure 4:
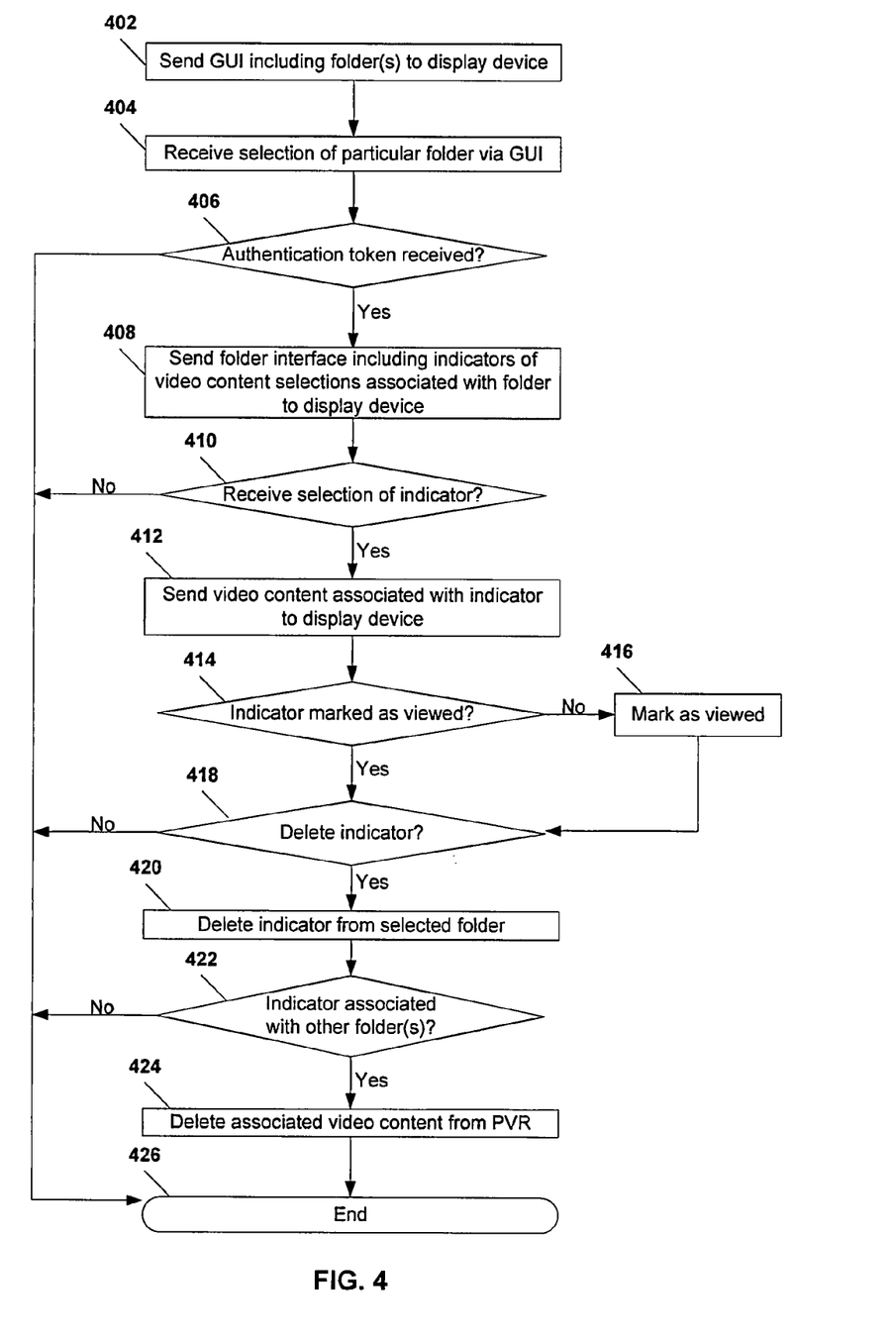
FIG. 4 is a flow diagram illustrating a second particular embodiment of a method of storing video content.

Referring to FIG. 4, a second particular embodiment of a method of storing video content is illustrated. At block 402, a personal video recording (PVR) device sends a graphical user interface (GUI) that includes one or more folders previously created by a user to a display device. Moving to block 404, the PVR device receives a selection of a particular folder via the GUI. Proceeding to decision node 406, the PVR device can determine whether an authentication token associated with the selected folder is received. If the authentication token is not received, the method terminates at 426. On the other hand, if the authentication token is received, the method continues to block 408, and the PVR device sends a file folder interface to the display device. The file folder interface includes one or more indicators of video content selections associated with the file folder and stored at the PVR device. Each indicator is marked as 'viewed' or 'unviewed.'

Advancing to decision node 410, the PVR device can determine whether it has received a selection of an indicator via the file folder interface. If the PVR device receives such a selection, the method moves to block 412, and the PVR device can provide video content associated with the indicator to the display device. At decision node 414, the PVR can determine whether the selected indicator is marked as 'viewed.' If the indicator is not marked as viewed, the PVR device can mark the indicator as 'viewed' in the file folder. The method then proceeds to decision node 418.

At decision node 418, the PVR device determines whether it has received a command to delete an indicator from the selected folder. If the PVR device determines that it has received such a command, the method moves to block 420, and the PVR device deletes the indicator from the selected folder. Continuing to decision node 422, the PVR device determines whether the indicator is associated with any other folders at the PVR device. If the indicator is not associated with any other folders at the PVR device, the method proceeds to block 424, and the PVR device can delete the video content associated with the indicator from a video content store at the PVR device. The method terminates at 426.

Figure 5:
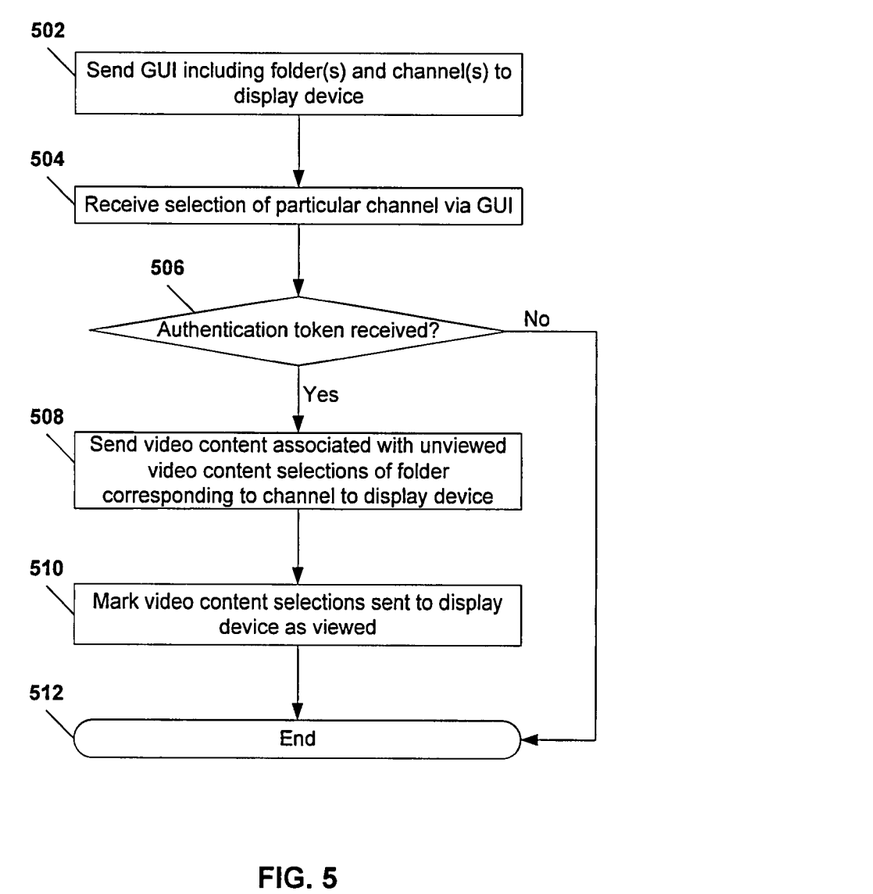
FIG. 5 is a flow diagram illustrating a third particular embodiment of a method of storing video content.

Referring to FIG. 5, a third particular embodiment of a method of storing video content is illustrated. At block 502, a personal video recording (PVR) device sends a graphical user interface (GUI) to a display device. The GUI includes one or more folders previously created by a user and an indicator of a channel corresponding to each folder. Moving to block 504, the PVR device receives a selection of a particular channel via the GUI. Proceeding to decision node 506, the PVR device can determine whether an authentication token associated with the selected folder is received. If the authentication token is not received, the method terminates at 526. Whereas, if the authentication token is received, the method advances to block 508. At block 508, the PVR device sends video content associated with unviewed video content selections of a file folder corresponding to the selected channel to the display device. The video content can be displayed via a channel of a video distribution network in an order that the video content selections were recorded or in an order that corresponds to the order in which a user has listed the video content selections in the file folder. Continuing to block 510, the PVR device marks the video content selections sent to the display device as 'viewed' in the file folder corresponding to the channel. The method terminates at 512.

Referring to FIG. 6, a particular embodiment of a graphical user interface related to storing video content is illustrated and designated generally 600. The GUI 600 includes a plurality of indicators of file collections at a personal video recording (PVR) device, such as the file folders 602-606. The file folders can include user-based folders, such as the file folder 602 labeled 'MOM.' The file folders can include one or more non-user-based folders, such as the video content category folder 604 labeled 'NEWS' or the home video folder 606 labeled 'HAWAII TRIP.' In a particular embodiment, the GUI 600 can include one or more indicators of channels 608 corresponding to the file folders 602-606. The file folders 602-606, the indicators of the channels 608, or any combination thereof, can be selectable via a highlight bar 610 or other suitable means for interacting with the GUI at a display device, such as via a remote control device.

Referring to FIG. 7, a second particular embodiment of a graphical user interface related to storing video content is illustrated and designated generally 700. The GUI 700 is a file folder-level interface that displays indicators of video content selections 702 associated with a particular file collection at a personal video recording (PVR) device, such as a 'KIDS' file collection. Each indicator is marked as viewed or unviewed, as shown at 704.

Figure 8:
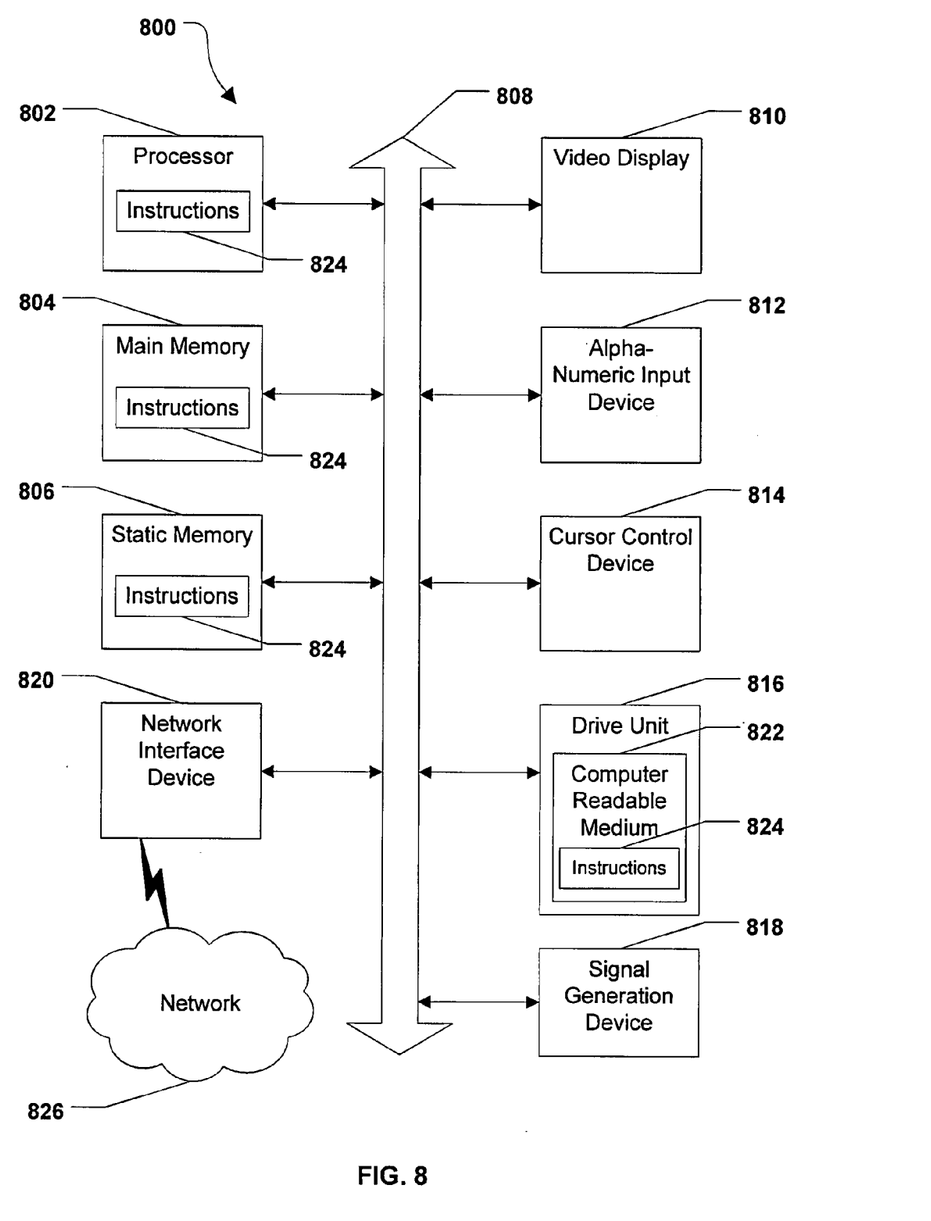
FIG. 8 is a block diagram of an illustrative embodiment of a general computer system.

Referring to FIG. 8, an illustrative embodiment of a general computer system is shown and is designated 800. The computer system 800 can include a set of instructions that can be executed to cause the computer system 800 to perform any one or more of the methods or computer based functions disclosed herein. The computer system 800 may operate as a standalone device or may be connected, e.g., using a network, to other computer systems or peripheral devices, such as a personal video recording (PVR) device or set-top box device, as illustrated in FIGS. 1-2.

In a networked deployment, the computer system may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics processing unit (GPU), or both. Moreover, the computer system 800 can include a main memory 804 and a static memory 806, that can communicate with each other via a bus 808. As shown, the computer system 800 may further include a video display unit 810, such as a liquid crystal display (LCD), an organic light emitting diode (OLED), a flat panel display, a solid state display, or a cathode ray tube (CRT). Additionally, the computer system 800 may include an input device 812, such as a keyboard, and a cursor control device 814, such as a mouse. The computer system 800 can also include a disk drive unit 816, a signal generation device 818, such as a speaker or remote control, and a network interface device 820.

In a particular embodiment, as depicted in FIG. 8, the disk drive unit 816 may include a computer-readable medium 822 in which one or more sets of instructions 824, e.g. software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 824 or receives and executes instructions 824 responsive to a propagated signal, so that a device connected to a network 826 can communicate voice, video or data over the network 826. Further, the instructions 824 may be transmitted or received over the network 826 via the network interface device 820.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
providing a graphical user interface of a personal video recording device to a display device, wherein the graphical user interface includes graphic elements that correspond to a plurality of selectable file folders of the personal video recording device, wherein each selectable file folder includes an identifier, wherein each of the plurality of selectable file folders is associated with a channel of a video distribution network, and wherein a particular file folder of the plurality of selectable file folders includes a plurality of files associated with a plurality of programs delivered via a particular channel associated with the particular file folder;

in response to receiving a first input selecting the particular file folder, determining whether a second input including authorization information is received;

in response to determining that the second input including the authorization information has been received, causing unviewed video content associated with the particular channel corresponding to the particular file folder to be sent to the display device for display via the particular channel of the video distribution network;

in response to receiving a command to delete an indicator stored in a first of the plurality of selectable file folders, determining whether the indicator is stored in any other file folder on the personal video recording device;

in response to determining that the indicator is stored in at least one other file folder of the personal video recording device, deleting the indicator; and in response to determining that the indicator is not stored in at least one other file folder of the personal video recording device, deleting the indicator and deleting a first file of the plurality of files associated with the indicator.

2. The method of claim 1, wherein the video distribution network comprises an internet protocol television access network.

3. The method of claim 1, further comprising marking the unviewed video content corresponding to the particular file folder as viewed in response to sending the unviewed video content to the display device.

4. The method of claim 3, wherein the unviewed video content is sent to the display device in chronological order.

5. The method of claim 3, wherein the unviewed video content is sent to the display device via a set-top box device coupled to the display device.

6. The method of claim 1, further comprising providing a plurality of video content selections associated with a file collection to the display device.

7. The method of claim 6, further comprising marking a video content selection of the plurality of video content selections corresponding to the unviewed content as viewed in response to sending the unviewed video content to the display device.

8. The method of claim 1, wherein a particular identifier is associated with a user-defined name.

9. The method of claim 1, wherein the authorization information includes a personal identification number.

10. The method of claim 1, wherein the personal video recording device is integrated with a set-top box device.

11. A computer-readable storage device storing processor-readable instructions that, when executed by a processor, cause the processor to perform operations comprising:

providing a graphical user interface of a personal video recording device to a display device, wherein the graphical user interface includes graphic elements that correspond to a plurality of selectable file folders of the personal video recording device, wherein each selectable file folder includes an identifier, wherein each of the plurality of selectable file folders is associated with a channel of a video distribution network, and wherein a particular file folder of the plurality of selectable file folders includes files associated with a plurality of programs associated with a particular channel that is associated with the particular file folder;

in response to receiving a first input selecting the particular file folder, determining whether a second input including authorization information is received;

in response to determining that the second input including the authorization information has been received, causing unviewed video content associated with the particular channel to be sent to the display device for display via the particular channel of the video distribution network;

in response to receiving a command to delete an indicator stored in a first of the plurality of selectable file folders, determining whether the indicator is stored in any other file folder on the personal video recording device;

in response to determining that the indicator is stored in at least one other file folder of the personal video recording device, deleting the indicator; and in response to determining that the indicator is not stored in at least one other file folder of the personal video recording device, deleting the indicator and deleting a first file of the plurality of files associated with the indicator.

12. The computer-readable storage device of claim 11, wherein the particular file folder includes a channel indicator associated with the particular channel, and wherein the operations further comprise associating the channel indicator of the particular channel with a file collection stored at the personal video recording device.

13. The computer-readable storage device of claim 11, wherein a particular identifier is associated with a user-defined name.

14. The computer-readable storage device of claim 11, wherein the authorization information includes a personal identification number.

15. The computer-readable storage device of claim 12, wherein the operations further comprise providing a plurality of video content selections associated with the file collection to the display device.

16. The computer-readable storage device of claim 15, wherein the operations further comprise marking a video content selection of the plurality of video content selections corresponding to the unviewed content as viewed in response to sending the unviewed video content to the display device.

17. A system comprising:
a processor; and
a memory accessible to the processor, the memory storing instructions that, when executed by the processor, cause the processor to perform operations comprising:

providing a graphical user interface of a personal video recording device to a display device, wherein the graphical user interface includes graphic elements that correspond to a plurality of selectable file folders of the personal video recording device, wherein each selectable file folder of the plurality of selectable file folders includes an identifier, wherein each of the plurality of selectable file folders is associated with a channel of a video distribution network, and wherein a particular file folder of the selectable file folders includes files associated with a plurality of programs delivered via a particular channel associated with the particular file folder;

in response to receiving a first input selecting the particular file folder of, determining whether a second input including authorization information is received;

in response to determining that the second input including the authorization information has been received, causing unviewed video content associated with the particular channel to be sent to the display device for display via the particular channel of the video distribution network;

in response to receiving a command to delete an indicator stored in a first of the plurality of selectable file folders, determining whether the indicator is stored in any other file folder on the personal video recording device;

in response to determining that the indicator is stored in at least one other file folder of the personal video recording device, deleting the indicator; and in response to determining that the indicator is not stored in at least one other file folder of the personal video recording device, deleting the indicator and deleting a first file of the plurality of files associated with the indicator.

18. The system of claim 17, wherein the particular file folder includes a channel indicator associated with the particular channel, and wherein the operations further comprise associating the channel indicator of the particular channel with a file collection stored at the personal video recording device.

19. The system of claim 18, wherein the operations further comprise providing a plurality of video content selections associated with the file collection to the display device.

20. The system of claim 19, wherein the operations further comprise marking a video content selection of the plurality of video content selections corresponding to the unviewed content as viewed in response to sending the unviewed video content to the display device.

21. The system of claim 17, wherein the personal video recording device is integrated with a set-top box device.

22. The system of claim 17, wherein the authorization information includes a personal identification number.

23. The system of claim 17, wherein the operations further comprise marking the unviewed video content corresponding to the particular file folder as viewed in response to sending the unviewed video content to the display device.

24. The system of claim 23, wherein the unviewed video content is sent to the display device in chronological order.

25. The system of claim 23, wherein the unviewed video content is sent to the display device via a set-top box device coupled to the display device.

* * * * *